United States Patent [19]

Lucas et al.

[11] Patent Number: 4,761,637
[45] Date of Patent: Aug. 2, 1988

[54] TOUCH INPUT DEVICE

[75] Inventors: Paul B. Lucas, Urbana; James E. Garrett, Champaign, both of Ill.

[73] Assignee: Carroll Touch Inc., Round Rock, Tex.

[21] Appl. No.: 928,652

[22] Filed: Nov. 5, 1986

Related U.S. Application Data

[63] Continuation of Ser. No. 621,575, Jun. 18, 1984, abandoned.

[51] Int. Cl.⁴ .......................... G08C 9/00; G08C 21/00
[52] U.S. Cl. .......................... 340/365 P; 340/365 UL; 340/712; 340/710; 178/18
[58] Field of Search ..................... 340/706, 712, 365 P, 340/802, 709–710; 178/18, 20; 250/221

[56] References Cited

U.S. PATENT DOCUMENTS

| | | | |
|---|---|---|---|
| 3,764,813 | 9/1973 | Clement et al. | 340/365 P |
| 3,775,560 | 11/1973 | Ebeling et al. | 178/18 |
| 3,860,754 | 1/1975 | Johnson et al. | 178/18 |
| 4,205,304 | 5/1980 | Moore | 340/365 P |
| 4,267,443 | 5/1981 | Carroll et al. | 250/221 |
| 4,301,447 | 11/1981 | Funk et al. | 178/18 |
| 4,517,559 | 5/1985 | Deitch et al. | 340/712 |

OTHER PUBLICATIONS

Markus, John, "Sourcebook of Electronic Circuits;" 1968, McGraw-Hill p. 24.

Primary Examiner—Marshall M. Curtis
Attorney, Agent, or Firm—Robert W. Pitts; Donald M. Boles

[57] ABSTRACT

An infrared touch input system is taught. Briefly stated, the system comprises a four-sided frame having an infrared transparent bezel along the inside thereof and having infrared emitters along the top and one side of the frame with infrared detectors along the sides opposite the emitters. Darlington transitor arrays are used as source and sink drivers for driving the LED's in an array. The I/O lines of a microprocessor in conjunction with the source and sink drivers are used to selectively energize each LED. Additional I/O lines of the microprocessor in conjunction with BCD decoders are used to selectively energize corresponding infrared detecting phototransistors before, during and after LED turn-on. A host computer supplies a clocking signal for the microprocessor with programming in the microprocessor thereby automatically performing the selection and deselection of emitters and detectors. A serial data stream is outputted from the microprocessor which indicates to the host computer the location of any broken light beams thereby indicating a stylus hit.

15 Claims, 12 Drawing Sheets

TOUCH INPUT DEVICE

This application is a continuation of application Ser. No. 621,575 filed June 18, 1984 now abandoned.

The present invention is related to material disclosed in the following concurrently filed, copending U.S. patent applications, all of which are assigned to the same assignee as the present invention:

Ser. No. 621,586, "Touch input Device Having Power profiling", filed June 18, 1984 now U.S. Pat. No. 4,672,364; and Ser. No. 621,585, "Touch Input Device Having Digital Ambient Light Sampling", filed June 18, 1984.

BACKGROUND OF THE INVENTION

The invention relates, generally, to a touch input device and, more particularly, to an opto-matrix frame having few components.

Coincident with the use of video displays has always been the problem of the man/machine interface. Traditionally, control of displayed information or cursors has been via a keyboard. Recently, however, a number of devices have been introduced which allow an operator to directly interact with the video display. These types of devices have included light pens, desk-type mouse controllers, or touch input devices such as a switch matrix or opto-electronic matrices. While generally switch-type overlays which are placed adjacent a video display are inexpensive to apply and utilize, they are generally susceptible to contact wear as well as distortion of the video information which is presented to the viewer, particularly in high usage environments. However, since opto-matrix schemes utilize light, which is generally in the infrared region, the switch matrix presented by the light beams is invisible to the viewer and, therefore, does not distort the video information displayed to the viewer and is not subject to wear in high usage environments. A number of schemes which utilize opto-matrix frames may be found in U.S. Pat. No. 4,267,443 "Photoelectric Input Apparatus", issued May 12, 1981 to Carroll et al; U.S. Pat. No. 4,243,879 "Touch Panel with Ambient Light Sampling", issued Jan. 6, 1981 to Carroll et al; and U.S. Pat. No. 3,764,813 "Coordinate Detection System", issued Oct. 9, 1973 to Clement et al. These three schemes address problems inherent with opto-matrix devices such as increasing frame resolution without a corresponding increase in components, surrounding or ambient light compensation, or optimization of emitter/detector driving and detecting networks respectively. These systems still have drawbacks in some areas such as large component usage thereby resulting in higher costs, ambient light sensing which is based on a predetermined value rather than dynamically, and difficulty in compensating for reflection or glare which may result in stylii hits not being recorded.

Glare problems generally occur when an emitter is adjacent the corner of the frame or bezel such that light produced by the emitter bounces off an adjacent surface and is then detected by the detector such that any stylus which is introduced to the video display inherently blocks the majority of the light received by the detector but the reflectant light is sufficiently high for the detector and its associated circuitry to not perceive a hit. Accordingly, it is desirable to have a device which minimizes the number of components necessary for addressing and detecting emitters and detectors. Further, it is also desirable to have a device which dynamically compensates for ambient light and for variations in emitter output and detector sensitivity. Also, it is desirable to have a device which minimizes glare problems. Such a scheme is taught in the present invention.

It is a principal object of the invention to provide a touch input device comprising a passive stylus, a plurality of optical emitters electrically interconnected in a matrix, a plurality of optical detectors electrically interconnected in a matrix, a driving device connected to the optical emitters for selectively energizing at least one emitter at a time, a gating device connected to the optical detectors for selectively detecting the amount of radiant energy received by at least one detector at a time, and a microcomputer connected to the driving and gating devices for sequentially energizing the driving and gating devices, the microcomputer producing a data output signal which corresponds to the presence or absence of radiant energy received by the optical detectors thereby indicating the interference of the passive stylus.

BRIEF DESCRIPTION OF THE DRAWINGS

Reference is now made to the accompanying drawings in which.

DESCRIPTION OF THE PREFERRED EMBODIMENT CONSTRUCTION OF THE PRESENT DEVICE

Figure 1:
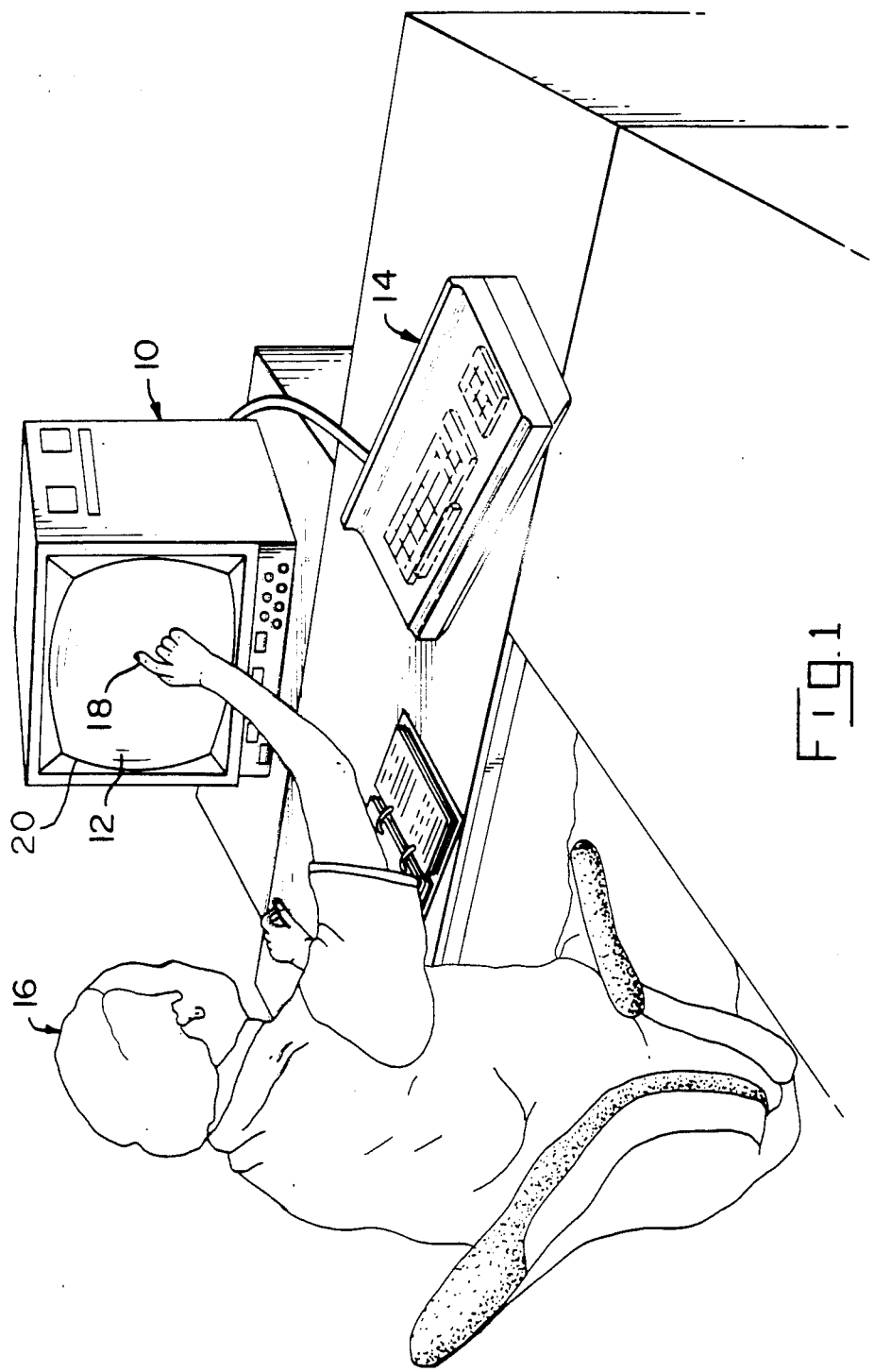
FIG. 1 is a representative view of an operator utilizing a video display.

Referring now to FIG. 1, there is illustrated a representative view of an operator utilizing a video display. Shown is a CRT 10 having a display area 12 and which generally interacts with a keypad or keyboard 14. An operator 16 interacts with the display area 12 through the use of the stylus 18, which in the preferred embodiment of the present invention, is the finger of the operator thereby presenting a truly touch-type interactive system. It is to be understood, however, that other types of stylii can and may be used without departing from the spirit and scope of the present invention such as, for example, pencils, pointers, or other similar types of apparatus. While the keypad 14 is shown, it is one of the primary objects of the present invention to utilize the keypad 14 as little as possible, if at all, with the operator 16 utilizing the stylus 18 for direct interaction with the CRT. A touch input area is generally defined by what the operator 16 sees in the display area 12. In the preferred embodiment of the present invention, this touch area utilizes emitters which are disposed on the bottom and one side of the display with detectors located on the top and opposite side thereby forming an infrared light beam matrix (shown more clearly in FIG. 5). The light beams (not shown) shine through the bezel 20 which is disposed around the edge of the CRT 10 and which, in the preferred embodiment of the present invention, is opaque to visible light but transparent to infrared light. It is to be understood, however, that other types of bezels which exhibit different types of light transmission properties may be utilized.

Figure 2:
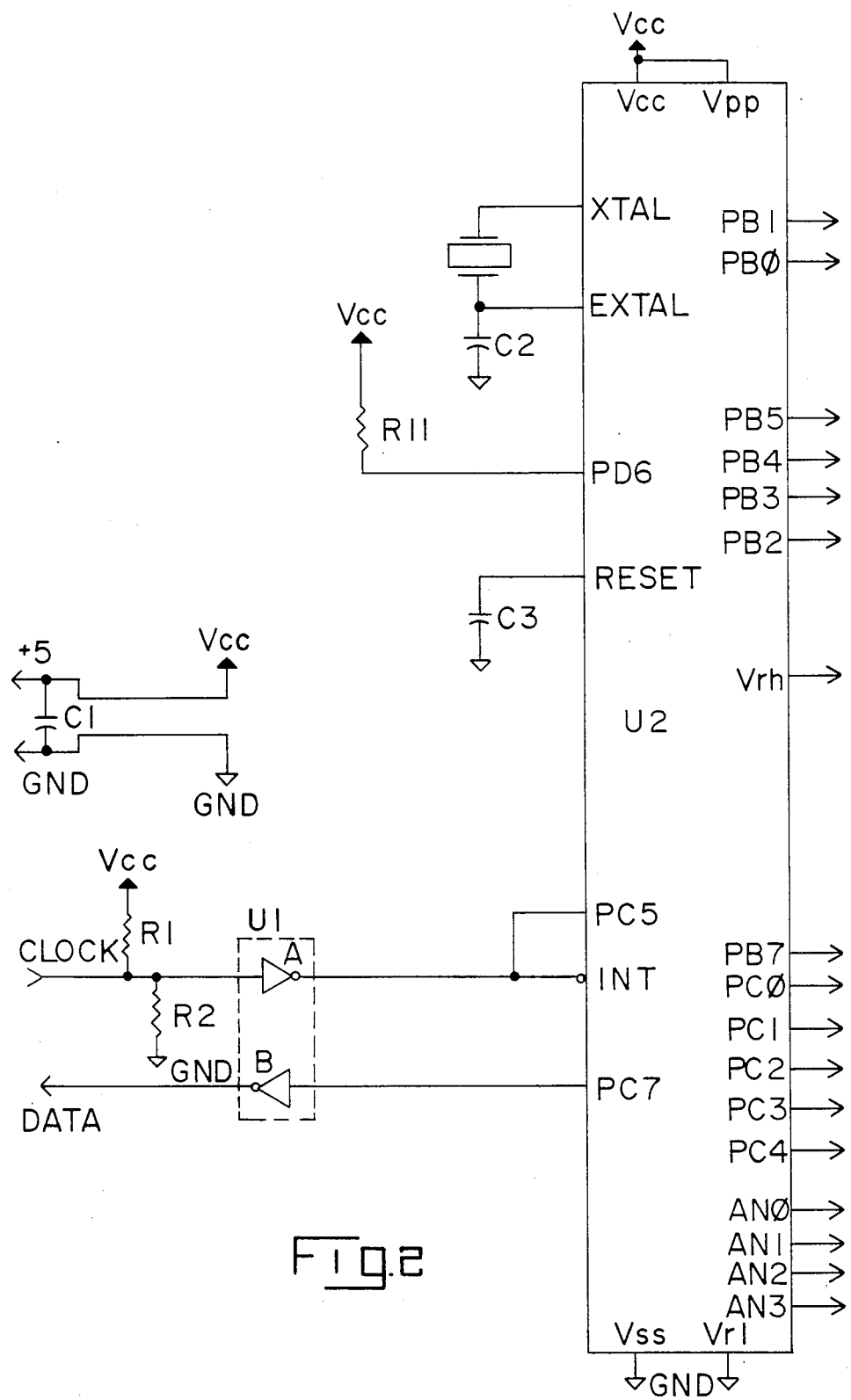
FIGS. 2, 3 and 4 form a complete schematic diagram for use in conjunction with the touch input entry device of the present invention.
Figure 3:
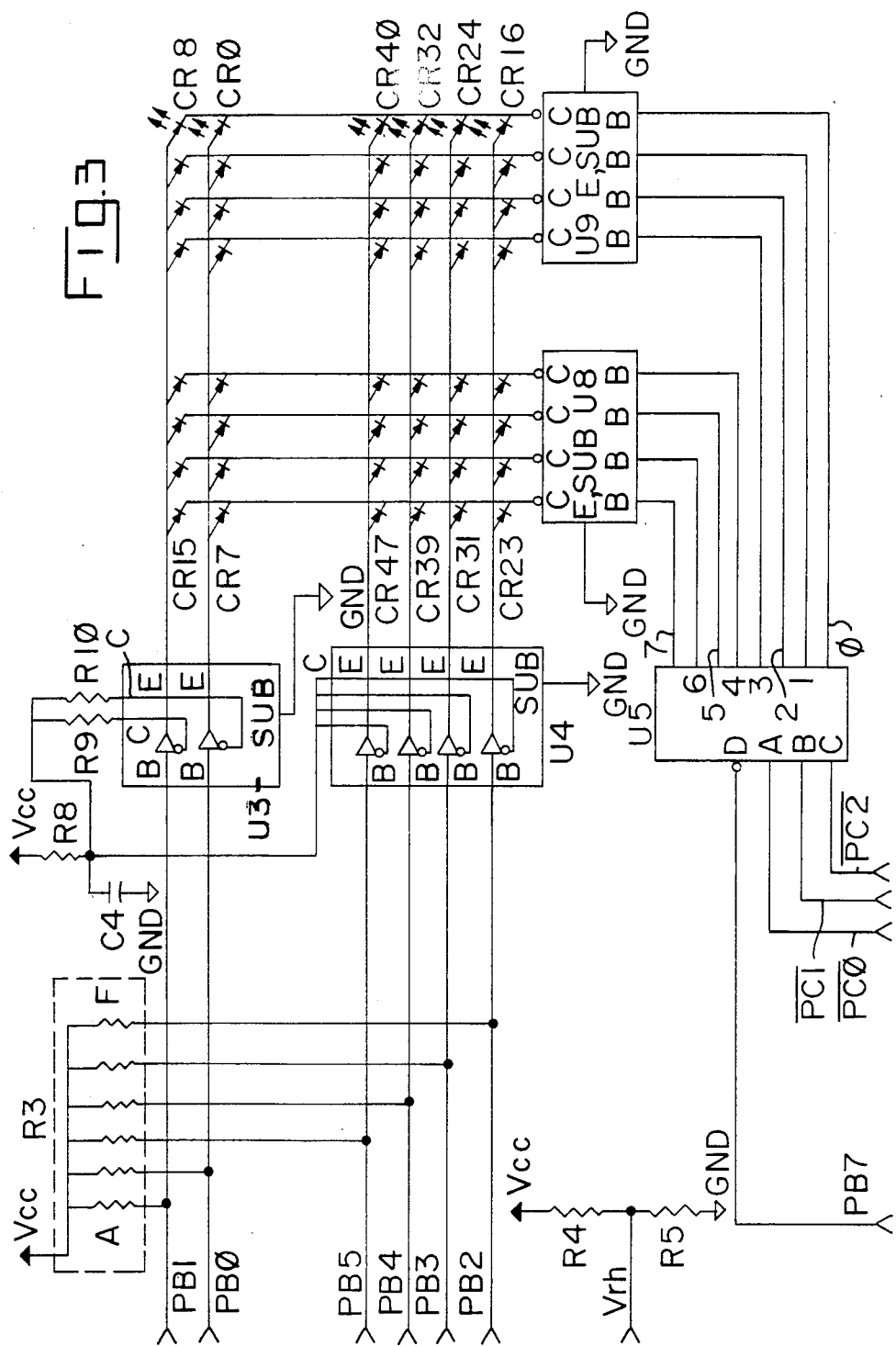
Figure 4:
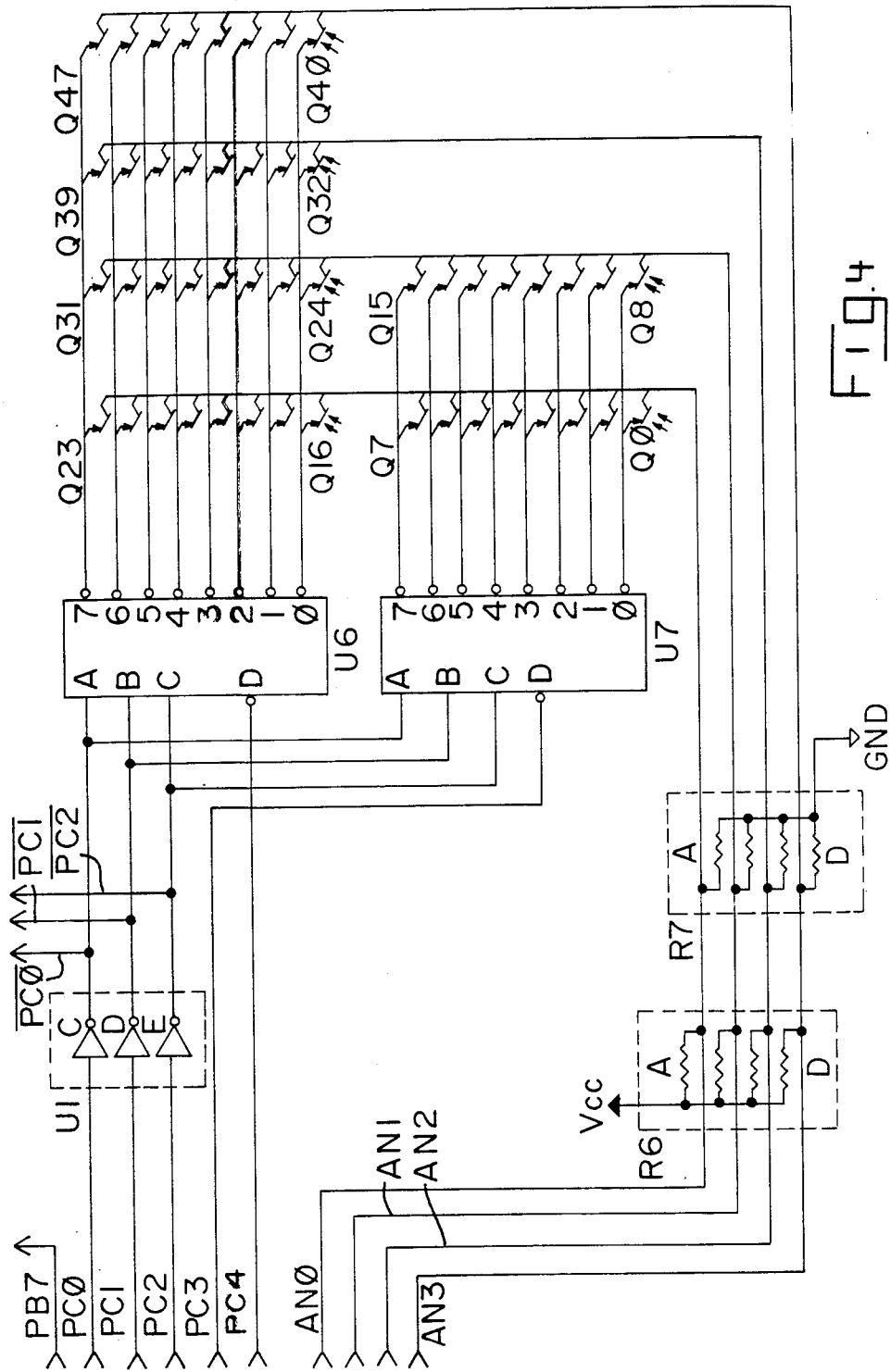

Referring now to FIGS. 2, 3 and 4, there is illustrated a schematic for the present invention. A list of the major component designations and functions is shown in Table 1 below.

TABLE I

| Component Number | Component Type |
| --- | --- |
| U1 | Schmidt Trigger Inverter |
| U2 | Microprocessor |
| U3, U4, U8, J9 | Darlington Transistor Array |
| U5, U6, U7 | BCD-to-Decimal Decoder |
| CR0–CR47 | Light Emitting Diodes (Emitters) |
| Q0–Q47 | Phototransistors (Detectors) |

Also shown is a microprocessor U2 which, in the preferred embodiment of the present invention, is an 8-bit microcomputer having on-board analog-to-digital converter as well as RAM and ROM, and is an HMOS device preferably of the 6800 family of microcomputers produced by companies such a Motorola of Austin, TX. It is to be understood, however, that other types of microcomputers can be utilized which may be CMOS or NMOS and which have been produced by other manufacturers having different bit-byte configurations such as 16 or 32-bit bytes. These machines like the preferred 6800 family architecture are readily known and available to one skilled in the art. The design of the present invention does not require the use of all features and pins attendant to the U2 microprocessor and therefore only those utilized will be discussed and are shown. The Vcc terminal is connected to Vcc power which, in the preferred embodiment of the present invention, is +5 volts and is also connected to terminal Vpp. Vcc supplies operating power to most of the microprocessor U2 while Vpp supplies the programming voltage for the ROM memory in the microprocessor U2 which, in the preferred embodiment of the present invention, is EPROM, although it is to be understood that masked versions of the microprocessor may be utilized with the result that Vpp is no longer necessary. The XTAL and EXTAL terminals have a crystal disposed therebetween with the EXTAL terminal having one terminal of capacitor C2 connected thereto with the remaining terminal of capacitor C2 connected to Ground (Gnd). This thereby provides a stabilized clock frequency for the entire system of the present invention. The RESET terminal is connected to one terminal of capacitor C3 with the remaining terminal of capacitor C3 also connected to Gnd. Terminal PC5, which is an I/O pin, is connected to the interrupt terminal INT and is connected to the output of the A inverter of device U1 which is a Schmidt-type trigger inverter with the input to inverter A of component U1 being connected to one terminal of R1 and one terminal of R2 as well as to the clock terminal which is thereafter provided by a host computer (not shown). The remaining terminals of R1 and R2 are connected to Vcc and Gnd respectively. The I/O pin PC7 is connected to the input of the V inverter of device U1 with the output of the V inverter of device U1 being a data output terminal which is also connected to a host computer (not shown). Also shown on FIG. 2 is capacitor C1 which acts as a filtering capacitor and is connected such that one terminal is attached to the +5 or Vcc bus with the other terminal attached to the Gnd bus. Port B I/O lines PB0, PB1, PB2, PB3, PB4, PB5 and PB7 provide coding and decoding for the emitters and detectors of the present invention as shown more clearly in FIGS. 3 and 4. Pin Vrh is a voltage reference high pin which provides the high voltage reference for the analog/digital conversion portion of the microprocessor U2. The Vrl pin is a voltage reference low pin which provides the low reference voltage for the analog-to-digital portion of the microprocessor U2. Port C terminals PC0, PC1, PC2, PC3 and PC4 are I/O pins which interconnect with the coding and decoding of the emitter/detector array as shown more clearly in FIGS. 3 and 4. Analog-to-digital terminals AN0, AN1, AN2 and AN3 are interconnected with the detection circuitry as shown more clearly in FIG. 4. The Vss terminal of the microprocessor U2 is connected to Gnd, WHILE I/O pin PD6 is connected to one terminal of resistor R6. The remaining terminal of resistor R6 is connected to Vcc.

Referring now to FIG. 3, the emitter portion of the present invention is shown. The PB0 line is connected to one terminal of resistor A of resistor network R3 as well as to the base terminal of one of the Darlington transistor pairs of component U3, a Darlington transistor array, while I/O line PB1 is connected to resistor B of resistor network R3 which is in turn connected to the base of another Darlington transistor pair of component U3. Similarly, I/O lines PB2, PB3, PB4 and PB5 are connected to resistors F, E, D and C respectively of resistor network R3 as well as to a base terminal of the Darlington transistor pair contained in component U4, also a Darlington transistor array. The remaining terminals of transistors A, B, C, D, E and F of resistor network R3 are tied together and thereafter to Vcc. The Vrh line is connected to one terminal of resistors R4 and R5 with the remaining terminals of resistors R4 and R5 being connected to Vcc and Gnd respectively. The I/O line PB7 is connected to the D input of component U5 which is a binary coded decimal (BCD) to decimal decoder while $\overline{PC0}$, $\overline{PC1}$ and $\overline{PC2}$ (supplied by component U1, not shown) are connected to the A, B and C inputs respectively of decoder U5. The collector terminal associated with the Darlington transistor pair for I/O line PB0 is connected to one terminal of resistor R10 while the collector terminal associated with the Darlington pair for I/O line PB1 is connected to one terminal of resistor R9. The remaining terminals of resistor R9 and R10 are thereafter connected to each other and to one terminal of resistor R8 and capacitor C4 as well as to all four of the collector terminals associated with the Darlington transistor array U4. The remaining terminal of resistor R8 is connected to Vcc while the remaining terminal of capacitor C4 is connected to Gnd. The SUB terminals of Darlington transistor arrays U3 and U4 are connected to Gnd. The emitter terminal of the Darlington transistor pair associated with I/O line PB0 of component U3 is connected to the anode of emitters CR0, CR1, CR2, CR3, CR4, CR5, CR6 and CR7 while similarly the emitter of component U3 which is associated with the I/O line PB1 is connected to the anode of emitters CR8 through CR15. The emitters in the preferred embodiment of the present invention are infrared light emitting diodes although it is to be understood that other types of emitters can and may be utilized without departing from the spirit and scope of the present invention. Similarly, the emitter terminals associated with I/O lines PB2, PB3, PB4 and PB5 of Darlington transistor array U4 are connected to the anodes of emitters CR16–23, CR24–31, CR32–39 and CR40–47 respectively. The anodes of emitters CR7, CR15, CR23, CR31, CR39 and CR47 are connected to the collector terminal of one of the Darlington transistor pairs of U8 which is also a Darlington transistor array with the base terminal associated with this Darlington transistor pair being connected to terminal 7 of U5, a BCD-to-decimal decoder. Similarly, the cathodes of emitters CR6, CR14, CR22, CR30, CR38 and CR46 are connected to the collector terminal of another Darlington transistor pair of component U8 with the base terminal associated therewith being connected to output pin 6 of decoder U5. The cathodes of emitters CR5, CR13, CR21, CR29, CR37, and CR45 are connected to the collector terminal of a Darlington transistor pair of component U8 with the base terminal associated therewith being connected to pin 5 of decoder U5. The cathode terminals of emitters CR4, CR12, CR20, CR28, CR36 and CR44 are connected to the collector terminal of another Darlington transistor pair of array U8 with the base terminal associated therewith being connected to output pin 4 of decoder U5. The cathodes of emitters CR3, CR11, CR19, CR27, CR35 and CR43 are connected to the collector terminal of a Darlington transistor pair from component U9 which is another Darlington transistor array with the base terminal associated therewith being connected to output pin 3 of decoder U3. The cathodes of emitters CR2, CR10, CR18, CR26, CR34 and CR42 are similarly connected to a collector terminal of another Darlington transistor pair of array U9 with the base terminal associated therewith being connected to terminal 2 of decoder U5. The cathodes of emitters CR1, CR9, CR17, CR25, CR33 and CR41 are connected to the collector terminal of another Darlington transistor pair of array U9 with the base terminal associated therewith being connected to output pin 1 of decoder U5. The cathodes of emitters CR0, CR8, CR16, CR24, CR32 and CR40 are connected to the collector of another Darlington transistor pair contained in array U9 with the base terminal associated therewith being connected to output pin 0 of decoder U5. The emitter terminals and SUB terminals of array U8 are connected together and thereafter to Gnd while, similarly, the emitter and SUB terminals of array U9 are also connected together and thereafter to Gnd. Accordingly, through the use of arrays U3, U4, U8 and U9, the emitters CR0 through CR47 are connected so as to form a matrix (the operation of which will be described more fully below).

Referring now to FIG. 4, there is shown the detection and decoding circuitry associated with the detectors of the present invention. The I/O line PC0 is connected to the input of inverter C of component U1 while, similarly, I/O lines PC1 and PC2 are connected to the input of inverters D and E of component U1. This thereby produces PC0, PC1 and PC2 which is connected to terminals A, B and C respectively of decoder U5 (previously mentioned) as well as to terminals A, B and C respectively of binary coded decimal-to-decimal decoders U6 and U7. Port C I/O line PC3 is connected to the D terminal of decoder U7 while I/O terminal PC4 is connected to the D terminal of decoder U6. Analog-to-digital I/O line AN0 is connected to one terminal of the A resistors of transistor arrays R6 and R7 and thereafter to the collector terminals of the phototransistors or detectors Q0, Q1, Q2, Q3, Q4, Q5, Q6, Q7 and Q16, Q17, Q18, Q19, Q20, Q21, Q22, Q23. Digital I/O line AN1 is similarly connected to one terminal of the B resistors of resistor networks R6 and R7 and thereafter connected to the collectors of detectors Q8 through Q15 and Q24 through Q31. The digital I/O line AN2 is connected to one terminal of the C resistors of resistor networks R6 and R7 and thereafter to the collectors of the detectors Q32 through Q39. Similarly, the I/O line AN3 is connected to one terminal of the D resistors of the resistor networks R6 and R7 and thereafter to the collectors of detectors Q40 through Q47. The remaining terminals of resistors A, B, C and D of R6 are connected together and thereafter to Vcc while the remaining terminals of resistors A, B, C and D of resistor network R7 are similarly connected together and thereafter to Gnd. The output pin 0 of decoder U7 is connected to the emitter terminals of detectors Q0 and Q8 while similarly the paired emitter terminals of detectors Q1 and Q9, Q2 and Q10, Q3 and Q11, Q4 and Q12, Q5 and Q13, Q6 and Q14, Q7 and Q15 are connected together and thereafter to terminals 1, 2, 3, 4, 5, 6 and 7 respectively of decoder U7. Additionally, the emitters of detectors Q16 and Q24 and Q32 and Q40 are connected together thereafter being connected to terminal 0 of decoder U6 while, similarly, the four emitters from detectors Q17 and Q25 and Q33 and Q41, Q18 and Q26 and Q34 and Q42, Q19 and Q27 and Q35 and Q43, Q20 and Q28 and Q36 and Q44, Q21 and Q29 and Q37 and Q45, Q22 and Q30 and Q38 and Q46, Q23 and Q31 and Q39 and Q47 are connected together and thereafter to terminals 1, 2, 3, 4, 5, 6 and 7 respectively of decoder U6. This thereby creates a matrixing scheme similar to that of the emitters of FIG. 3.

Figure 5:
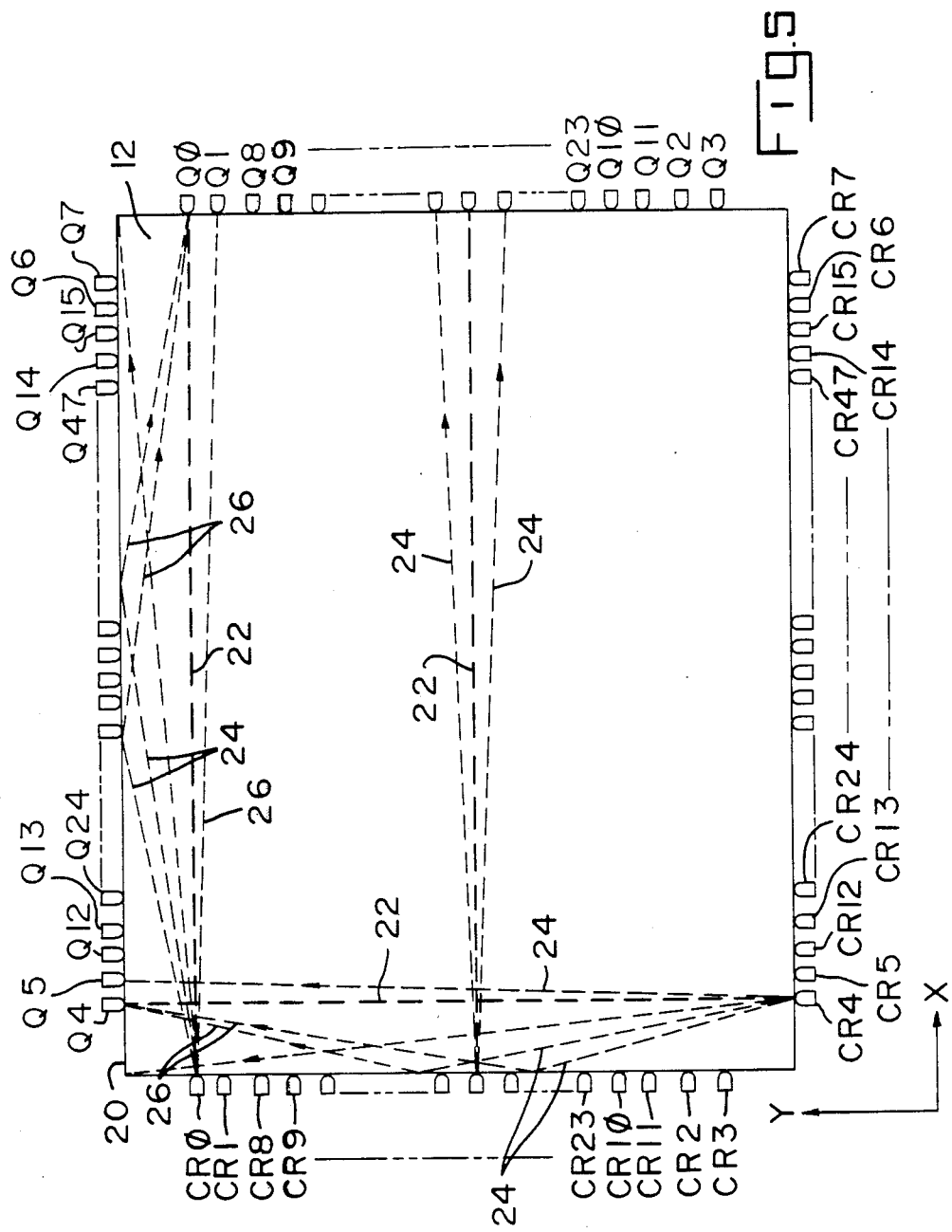
FIG. 5 is a representational view of glare produced by the frame surrounding the opto-matrix devices as well as a numbering assignment of the emitters and detectors of the present invention.
Figure 6:
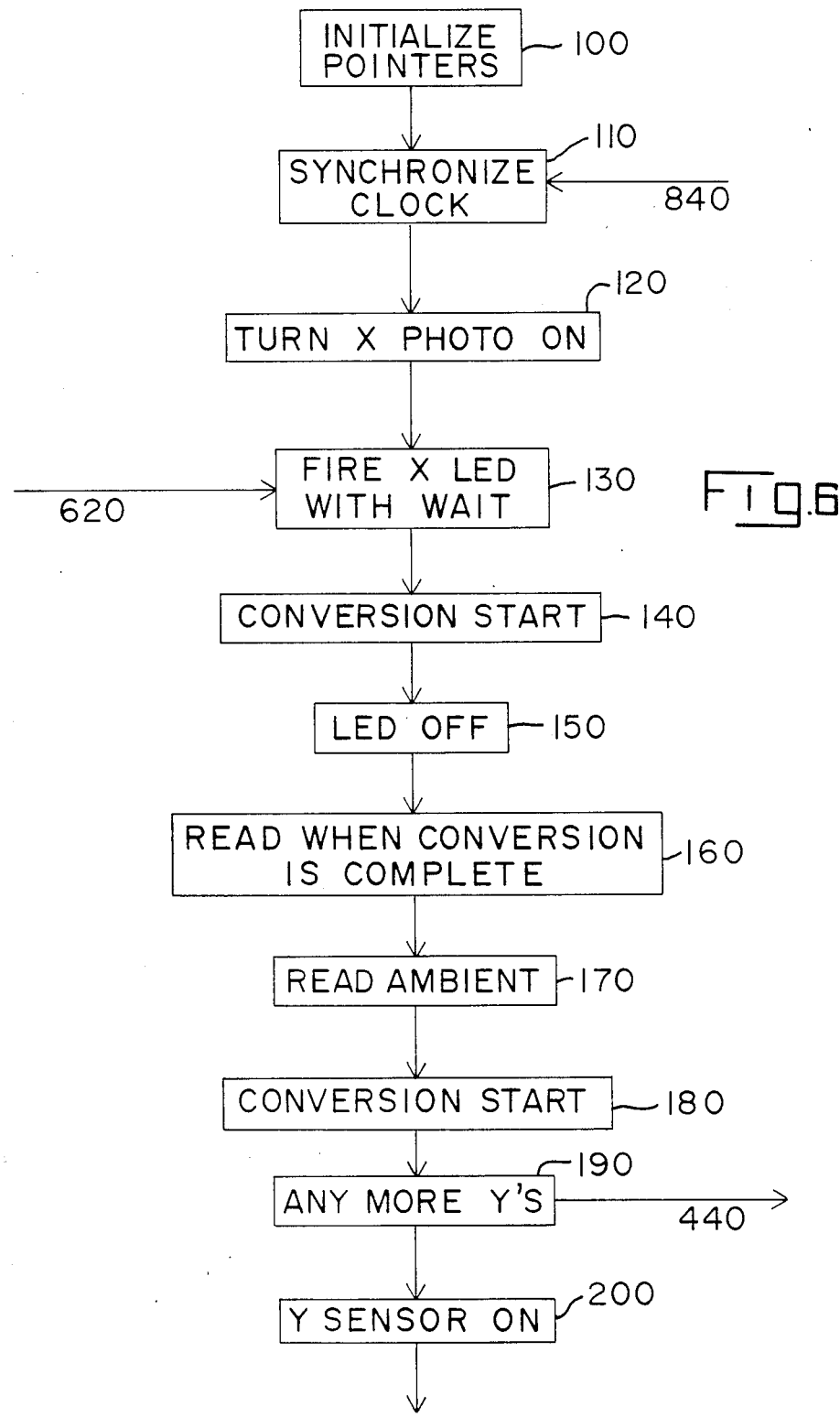
FIGS. 6 through 11 are flow chart diagrams for use with the preferred embodiment of the present invention.
Figure 7:
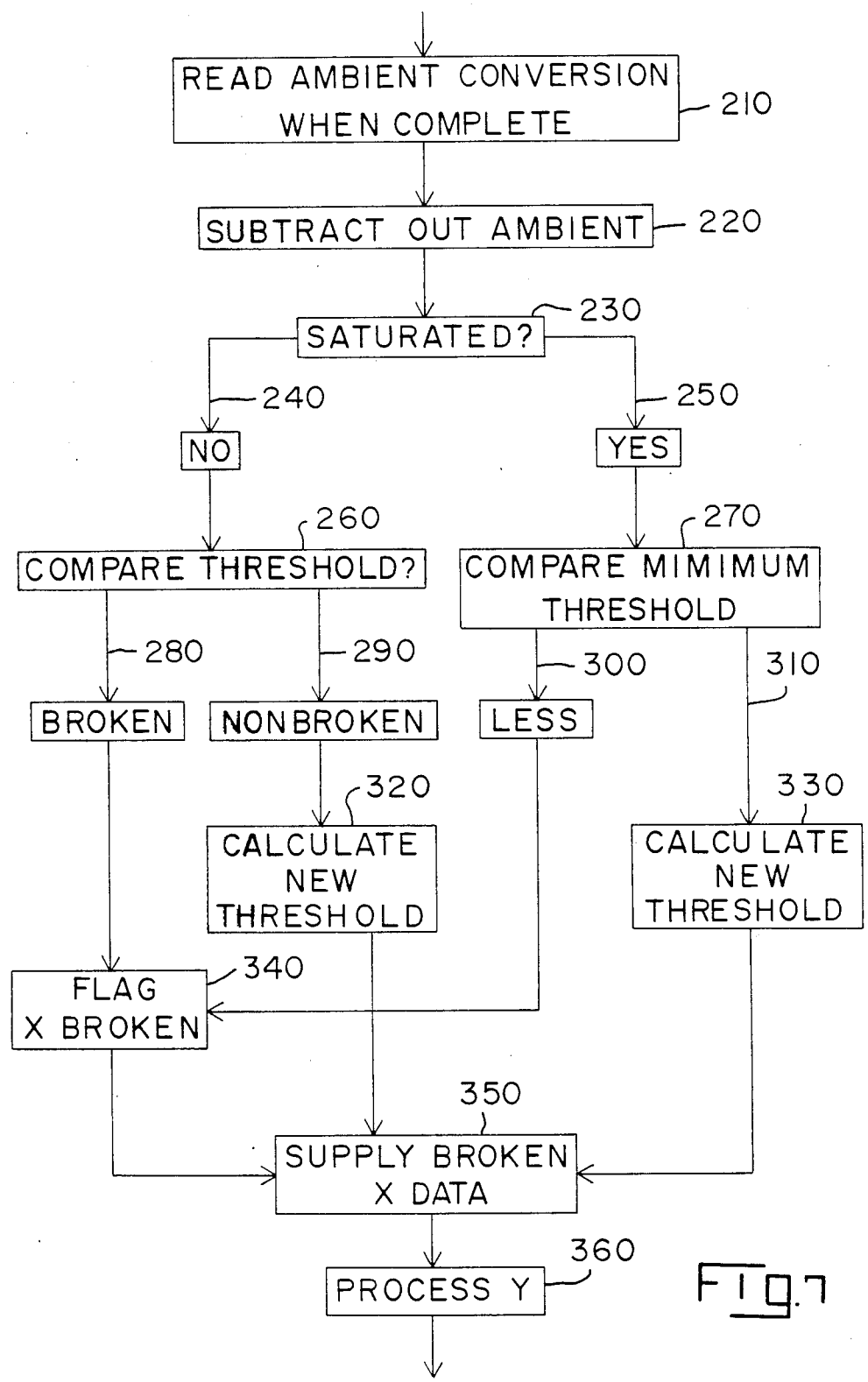
Figure 8:
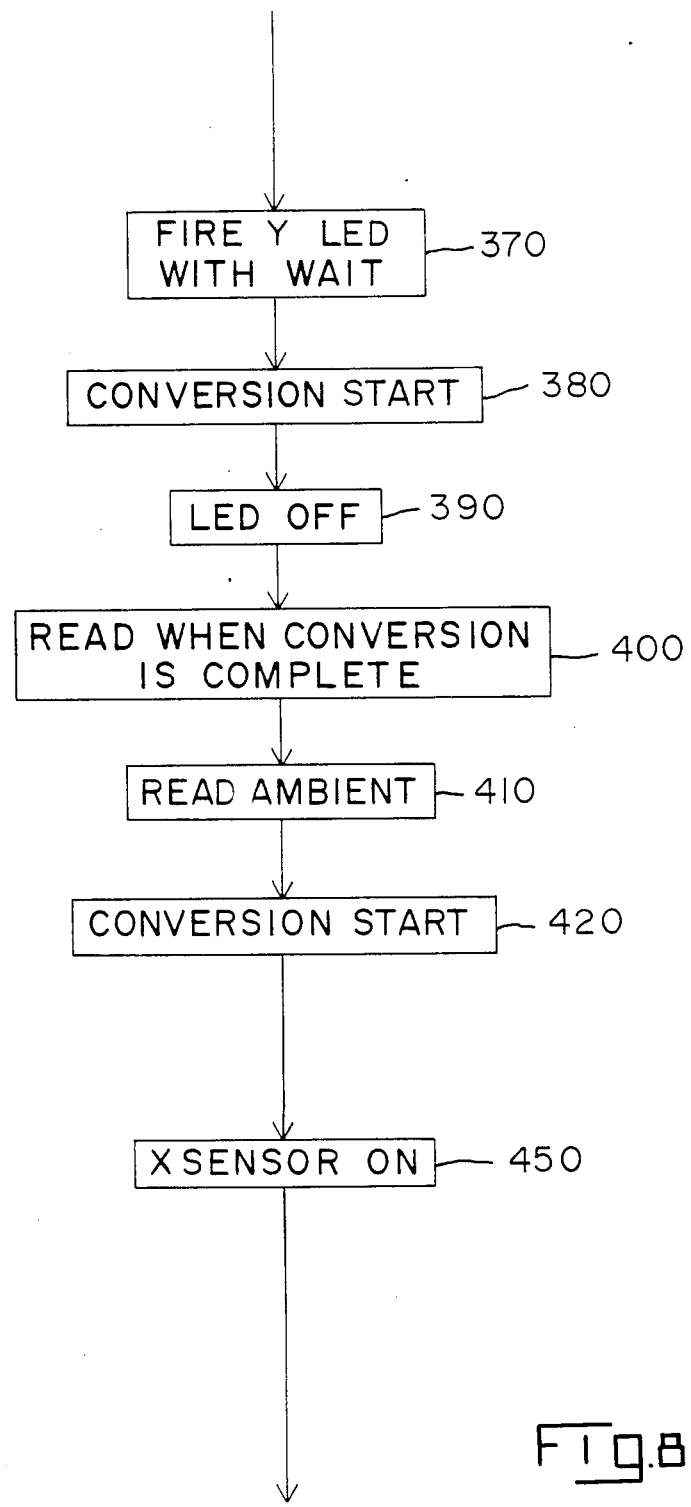
Figure 9:
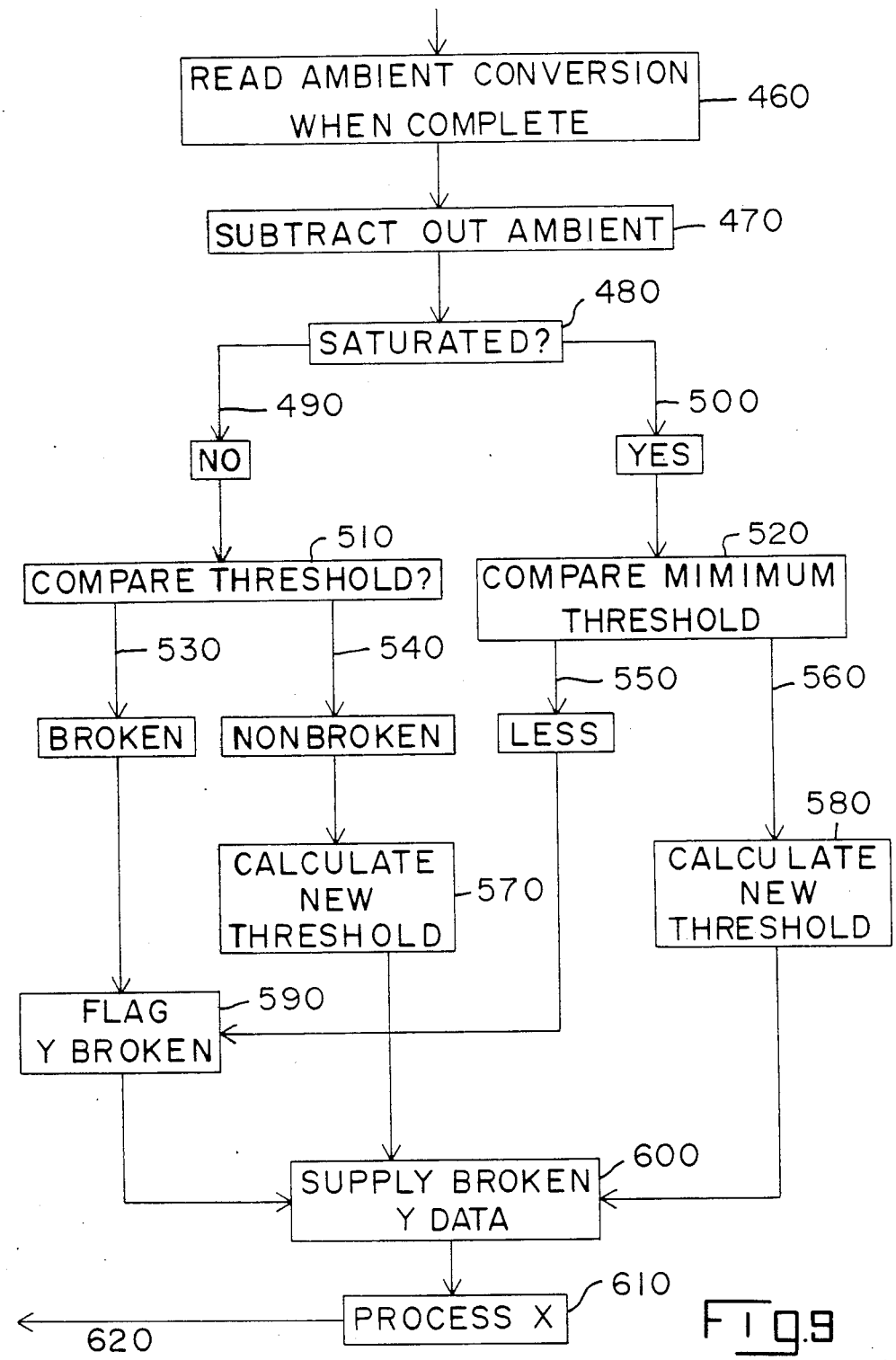
Figure 10:
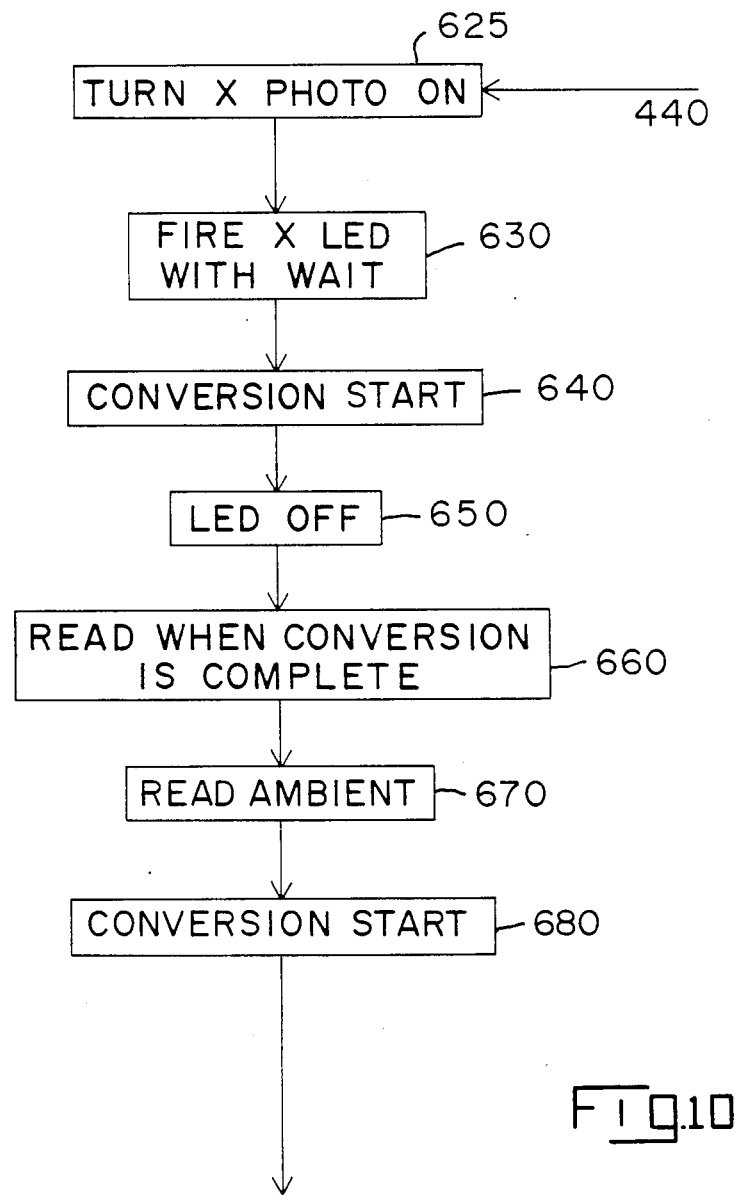
Figure 11:
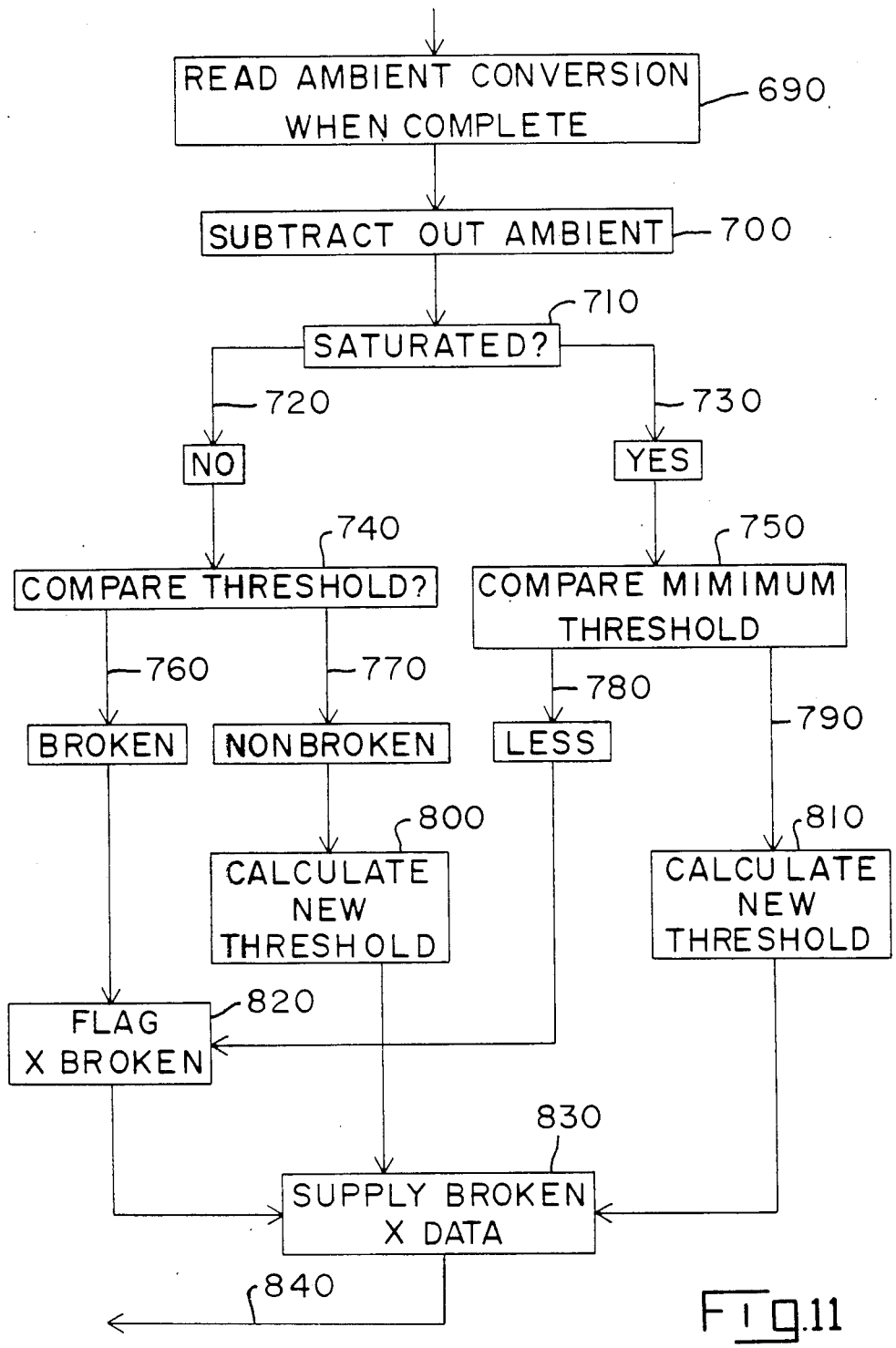

Referring now to FIG. 5 there is illustrated a diagrammatic representation of an opto-matrix frame and bezel. Shown are emitters CR0 through CR47 and detectors Q0 through Q47 which comprise a 16×32 matrix with 16 emitters and detectors in the Y or vertical direction and 32 emitters and detectors in the X or horizontal direction. It is to be understood that although not shown the emitters and detectors are fixedly mounted on a printed circuit board or the like for properly holding and aligning an emitter/detector pair. Also diagrammatically illustrated is the light pattern produced by an emitter and which is received by a detector. Each emitter when energized, from a diagrammatic standpoint, can be said to produce a principal light beam pattern shown generally at 22 with non-collimated light 24 dispersing further and further apart, the more distant the detector is from the emitter. This therefore causes detectors adjacent the light received by the principal light beam 22 to register some light and which must be compensated for as will be discussed more fully below. Further, when emitters such as CR0 and CR4 are adjacent the corner and thereby the bezel 20, non-collimated light 24 will have a tendency to bounce off the bezel 20. This bounced light produces a reflected beam shown generally at 26 with the result that some of the reflected beams 26 are received by the detector which is the object of the principal light beam 22. Therefore, should a stylus be introduced into the display area 12 and which does in fact block the principal light beam 22, some non-collimated light 24 via the reflected beams 26 is received by an associated detector such as Q0 with the result that, under certain light conditions, sufficient light is received by the detector such that a hit by a stylus is not registered as such. This problem of reflected light or glare becomes less and less prevalent as the detectors towards the center of the CRT are utilized. Due to manufacturing efficiencies, the same detectors and emitters are utilized near the corners of the bezel 20 as near the center. Accordingly it has been found that, by reducing the power and thereby light output for four emitters adjacent each corner of the bezel 20, the power of the reflected beams is reduced to an acceptable non-error-producing level. Accordingly, by reducing the power to emitters CR0, CR1, CR2, CR3, CR4, CR5, CR6, and CR7 to one level of reduced power and reducing power to emitters CR8, CR9, CR10, CR11, CR12, CR13, CR14 and CR15 to a second level of power, light output may be decreased adjacent the corners of the bezel for the first two emitters, slightly increased for the next two emitters and is at full power for the rest of the opto-matrix frame. It is to be understood, however, that more or less numbers of emitters may be given reduced power or that the detectors may similarly be treated without departing from the spirit and scope of the present invention.

OPERATION OF THE PRESENT DEVICE

Referring now to FIGS. 2, 3 and 4, the overall electrical operation of the present invention will be discussed. It is to be remembered that the present invention interacts with a host computer (not shown) which allows a CRT to present information over a video display area 12 which is part of an interactive relationship between the operator 16 and a program or operation such that the opto-matrix touch input screen designates operator decisions to the host computer. It is submitted that the host computer and the programs used with it are within the scope of one skilled in the art and therefore are not discussed in detail below. The host computer introduces a clock signal to the clock terminal of FIG. 1, which is received by the C port I/O line PC5 and the interrupt terminal of the microprocessor U2. This clock stream produced by the host computer continues for as long as input from the opto-matrix frame may be desired with the result that upon the absence of a clock signal, an interrupt is initiated in the microprocessor U2. Accordingly, upon appropriate power up and the presence of clock signals to the microprocessor U2, the opto-matrix device begins a scan-type of sequence which causes the LED's to be fired, phototransistors to be read, and internal analysis of the information by appropriate software. Since the operation of the present device is cyclical in nature, a signal cycle will be discussed by way of example, although it is to be understood that the remainder of the devices perform in the same manner.

Upon power up of the microprocessor U2, a main program loop is initiated in software (FIGS. 6 through 11). It is submitted that the flow chart diagrams illustrated in FIGS. 6 through 11 taken together with the description of the preferred embodiment herewith are sufficient so as to enable one skilled in the art to write the appropriate software. This starts with the initialization of the pointers at 100, which thereby begins the X and Y beam count at a known start point of zero. Thereafter, the microprocessor waits for a preset number of synchronizing clock pulses at 110 which are received from the host computer thereby insuring complete synchronization between the microcomputer U2 and the host computer. An X phototransistor at 120 is then turned on which would be Q4 (FIG. 5) as the start of the initial cycle in the present example. This turning on of the phototransistor allows the transistor to settle down or stabilize. This is accomplished by selecting the appropriate address for I/O lines PC0, PC1 and PC2 which are presented to decoder U7 which is then enabled by I/O line PC3 which thereby allows current to flow through Q4. The LED CR4 is then fired by energization of I/O line PB0 in conjunction with the address presented by PC0, PC1 and PC2 along with the enabling I/O line PD7 which thereby enables line 4 of decoder U5. This firing of the X LED CR4 at 130 also takes into account a wait period so as to insure that the LED CR4 is completely turned on. Further, for LED's CR0 through CR7 a current-limiting resistor R10 is utilized in conjunction with the Darlington transistor array U3 (used as a source driver) which allows current to flow through emitter CR0 through CR7 at a decreased brightness. Similarly, for emitters CR8 through CR15, a second current-limiting resistor R9 is also utilized so as to diminish the light output of the associated emitters. The value of R9 is preferably one-half of R10 thereby firing the two emitters adjacent each corner of the bezel 20 (FIG. 5) at a brightness which is slightly less than the next two adjacent emitters. The remainder of the emitters which are driven by Darlington transistor array U4 do not utilize such current-limiting resistors since full brightness or maximum optical power output is desirable. In this manner, and as previously mentioned, a power profiling is accomplished such that for example, emitters CR0 and 1 have a reduced optical output power which thereby reduces the reflected beams 26 with CR8 and 9 having a slightly greater optical power but still less than the remainder of the emitters not adjacent to the corners of the bezel 20. Resistor array R3 is provided as a pull up resistor network to insure that each emitter has minimum proper power for firing. Accordingly, when CR4 is fired, current is caused to flow through the emitter of the lower Darlington transistor pair of array U3 which thereby drives a collector of Darlington transistor array U8 (used as a sink driver) such that the emitter is actively driven and the Darlington transistor array U8 and U9 are actively driven. After the LED CR4 is completely turned on a conversion is started at 140 which in this example dictates that analog-to-digital line AN0 takes the value produced by Q4 and starts to convert this value to a digital number. This digital number is determined by a reference value which is controlled by the reference divider of Vrh contained on the microprocessor U2 with all signal voltages being ratiometrically converted relative to this reference. It has been determined that this Vrh reference value should be set to Vq where Vq is the maximum voltage input and corresponds to a deselected phototransistor or to a selected phototransistor with an extremely low ambient light level. Resistor networks R6 and R7 determine the Vq maximum reference level. During the digital conversion process at 140, the LED CR4 is turned off at 150 with the digital conversion then completed and read and stored in the microprocessor at 160. With the LED CR4 off, another reading is taken of the phototransistor Q4 which results in a ambient light reading at 170 which is then started to be converted to a digital number at 180. Thereafter a count check is utilized at 190 to determine if there are any more Y's or Y phototransistors to interrogate. This is done since X and Y phototransistors are sampled alternately and since there are less devices in the Y direction than the X, for the purpose of expeditious processing, when the maximum number of Y devices have been sampled, the remainder of the X devices are sampled starting at 440 and described more fully below. Accordingly, in the present example there are more Y phototransistors to be sampled with the result that Y phototransistor Q0 is turned on at 200. Thereafter at 210 the ambient conversion of the X phototransistor Q4 which was read at 170 is completed with the ambient value subtracted out at 220. This therefore compares the read converted value at 160, which is the fired LED CR4 value, with the read ambient value at 170 where CR4 was off, subtracting the two and determining at 230 whether phototransistor Q4 is saturated. If Q4 is not saturated which would tend to indicate that a hit is present or something is blocking light from detector Q4 then a NO condition exists at 240 which is presented at 260. A comparison is then made which compares the value presented with a previously calculated and stored threshold level from 320 or 330 to determine whether the light beam is to be considered as broken or non-broken at 280 and 290 respectively. If the light beam was non-broken then a new threshold is calculated at 320. In the presence of a broken condition, a flag representing (in the present example) X4 broken is presented at 340. The new threshold and flag condition at 320 and 340 are thereafter presented as data at 350. Alternately, at 230 if a saturated condition exists, this is presented at 250 as a YES condition which is then given to 270 which is compared against a predetermined fixed minimum threshold value. If this value is less than the fixed minimum number, it is at 300 then considered as a broken flag condition which is presented to 340 and thereafter to 350. If the comparison at 270 determines that the difference is greater than or equal to a present threshold level, this is presented via 310 to 330 which calculates a new threshold level (for use at 260) which is in turn presented to 350 as a non-broken or non-hit condition. The new threshold value is computed at 320 or 330 and used by 260 as the threshold for comparison purposes. Accordingly, in this manner a continuous and dynamic sampling of ambient light is utilized and taken into account. Further, device degradation which generally occurs over a considerable period of time and which results in decreased sensitivity by the phototransistor or decreased light output by the emitter is automatically taken into account since, within predetermined absolute minimums and maximums, new thresholds are continuously calculated and utilized.

Processing of the Y axes is then started at 360 in a manner very similar to that of the X axes. This results in the Y LED CR0 being fired for a sufficiently long duration of time at 370 to insure complete LED turn-on with a digital conversion of Q0 started at 380. This conversion at 380 is possible since the Y sensor Q4 was turned on at 200. This seemingly early sampling of Q0 is done since the crystal which determines the frequency at which the microprocessor U2 runs is substantially greater than the clock rate or the data output rate (discussed below). Thereafter LED CR0 is turned off at 390 with the value received by Q0 read when the conversion is complete at 400. Upon completion of the conversion the ambient value of Q0 is determined at 410 with the conversion to a digital number started at 420. Immediately after the start of the digital conversion at 420, the next X sensor which is Q5 is turned on at 450. During the Q5 turn on period the ambient converted value Q0 is read when completed at 460 with the ambient value being subtracted out from the value determined during the firing of LED CR0 at 470. This value is then presented to 480 to determine whether detector Q0 is saturated at 480 with a NO or YES condition being presented to 490 or 500 respectively. Similarly, minimum thresholds are analyzed at 510 and 520. After the comparison at 510, a broken or non-broken condition is determined at 530 and 540 with a broken Y0 flag broken indication at 590 if a broken condition does exist or a new threshold being calculated at 570 if a non-broken condition exists. Again the flag condition and new threshold from 590 and 570 respectively are used to supply Y0 data at 600. The comparison made at 520 is presented by 550 as a flag at 590 if a less than minimum threshold condition exists or at 560 if a new threshold is to be calculated at 580. Thereafter, the new threshold level is calculated at 580 with this value and a non-broken condition supplied to 600. At this point a processing of an X coordinate emitter/detector pair is initiated at 610 and presented as 620 to begin again at block 130 which fires the next X LED CR5 with a repetition of the processing as mentioned for FIGS. 6 through 9. In this manner, toggling is accomplished between the X and Y axes until at box 190 it is determined that there are no more Y's to be interrogated which is then presented as a jump via 440 to box 625 which thereafter turns on the 17th X axis phototransistor, Q36. X axis LED CR36 is then fired at 630 with the process then continuing in a manner substantially identical to the previously discussed X and Y axes processing. Thereafter at box 830 the X data is presented at 840 to 110 with the process then repeating as long as the host computer continues to send out a clock signal.

It is to be remembered that during this entire time frame the host computer upon receiving a synchronization signal from microprocessor U2 in a data stream (described more fully below) is required to know in advance the size of the touch input matrix and to keep track of the data stream so as to know which X and Y pair status is being given.

Figure 12:
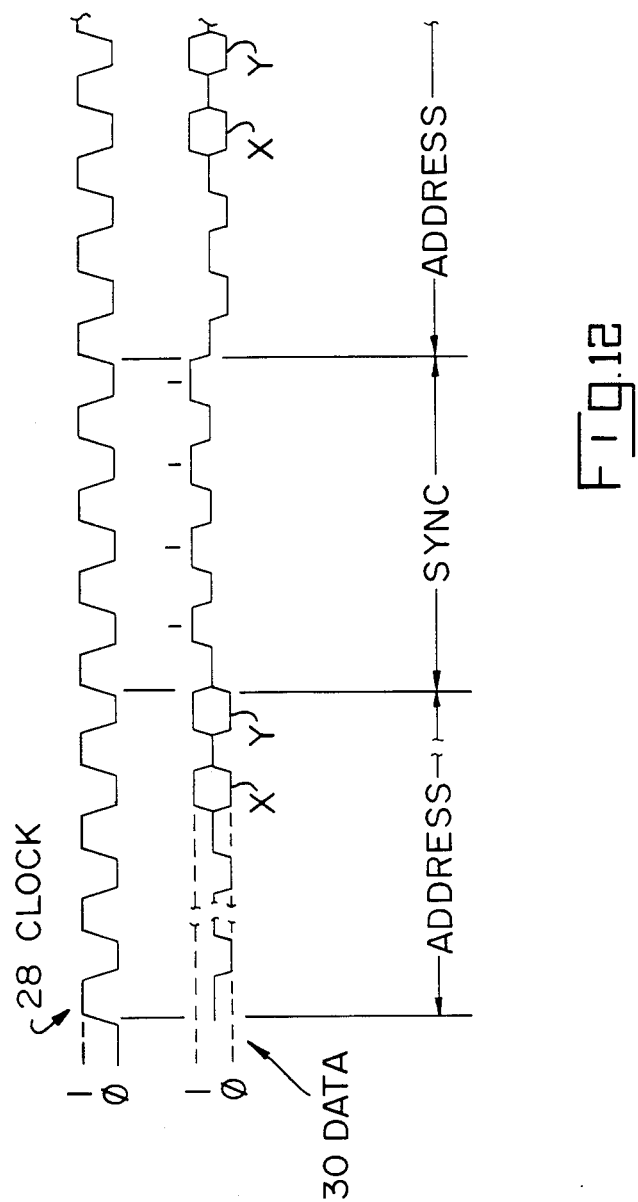
FIG. 12 is a timing diagram of the data output for use with the present invention.

Accordingly, at 350, 600 and 830 data which represents an X or Y broken or non-broken status condition is presented onto the data line. Therefore, referring now to FIG. 12 there can be seen a timing and data scheme for the present invention. Upon initialization and synchronization at 110 of FIG. 6 four continuous ones are placed onto the data line for the host computer to receive. This thereby lets the host computer know that a synchronization frame has occurred and that the host computer should now start to count. Thereafter, the data is presented in 4-bit bytes with the first two bits always being zero and the third and fourth bits indicating broken or non-broken conditions for the X and Y axes respectively. If a broken condition does exist, then a 1 is placed onto the data line and if an unbroken condition exists, then a 0 is utilized. As an example, should a hit occur at the intersection of CR0 and CR4 and since these are the first X and Y pairs interrogated, the first 4-bit byte of data after synchronization will read (0011). However, had a hit occurred at the intersection of CR0 and CR5, then the first 4-bit byte would have contained (0001) and the second 4-bit byte would have contained (0010). For those frames where no Y axis detector is being interrogated, a 0 is preferably inserted as a false bit although a 1 may also be utilized. This 4-bit byte data stream is continued until all the X detectors have been interrogated with the microprocessor U2 sending out the 4-bit sync cycle at the end of the interrogation thereby indicating a new cycle or frame. Additionally, the present device will allow for beam averaging, the disclosure of which may be found in U.S. Pat. No. 4,267,443 "Photoelectric Input Apparatus", issued May 12, 1981 to Carroll et al, incorporated by reference herein, and which allows for a stylus between two emitters to be registered as a hit between two beams thereby effectively doubling the resolution or interpolation of the present system to a 32×64 matrix.

It is to be remembered that many variations of the present invention may be accomplished without departing from the spirit and scope of the present invention. For example, power profiling resistors may be placed on individual emitters or detectors or at the decoders rather than at the Darlington transistor arrays without departing from the spirit and scope of the present invention. Further, the program could be utilized in a different sequence without departing from the spirit and scope of the present invention. Also, other data streams may be utilized such as parallel output using additional I/O lines which are available or different types of serial data streams. Additionally, different types of arrays other than Darlington transistors may be utilized while different types of decoders may be used while other types of detectors such as photodiodes may be used. It is also to be remembered that the firing or detection order of the emitters and detectors may be changed to any order desired. The present device may also be used with or without a display or a CRT or with a flat panel display.

Accordingly, the present invention produces a device which accommodates for changing ambient light levels, emitter and/or detector degradation and which has few components.

We claim:

1. A touch input device interactive with a host computer to convey data indicative of the interference of a passive stylus within the field of the touch input device to the host computer, the touch input device comprising:
   a plurality of optical emitters, electrically interconnected in a first matrix, the optical emitters being linearly disposed, each optical emitter having emitter first and second terminals, each optical emitter being individually independently addressable in the matrix through the first and second terminals;
   a like plurality of optical detectors, electrically interconnected in a second matrix, the optical detectors also being linearly disposed, each optical detector having detector first and second terminals, each optical detector being individually independently addressable in the second matrix through the detector first and second terminals, corresponding emitters and detectors being oppositely disposed, each emitter emitting a light beam incident on a corresponding detector;
   a plurality of separate driver means, each driver means connected to emitter first terminals of a plurality of emitters, and first decoder means having a plurality of decoder lines, each first decoder line electrically interconnected to an emitter second terminal of a plurality of emitters, each emitter being electrically interconnected to a unique combination of driver means and first decoder lines to form the first matrix, the driver means and first decoder means comprising means for sequentially activating individual emitters within the first matrix;
   second decoder means, each second decoder means having a plurality of lines, each second decoder line being connected to detector first terminals of the plurality of detectors, and a plurality of I/O signal lines, each I/O signal line being connected to detector second terminals of the plurality of detectors, each detector being connected to a unique combination of second decoder means and I/O signal lines to form the second matrix, the second decoder means and the I/O signal lines comprising means for sequentially activating the output of individual detectors within the second matrix; and
   microcomputer means including a plurality of I/O ports electrically connected to the driver means, the first and second decoder means and the I/O signal lines, the microcomputer means comprising means for sequentially activating corresponding emitters and detectors at the same time and means for processing signals received from the detectors prior to transmission to the host computer.

2. A device according to claim 1 wherein the optical emitters and the optical detectors are linearly disposed in corresponding X and Y arrays.

3. A device according to claim 2 wherein corresponding emitters and detectors are simultaneously energized as emitter-detector pairs.

4. A device according to claim 3 wherein the microcomputer means alternately energizes emitter-detector pairs in the X array followed by the Y array.

5. A device according to claim 4 wherein the microcomputer means comprises means for transmitting a series of bytes, each containing a bit indicative of the detection of a light beam from an emitter incident on a corresponding detector.

6. A device according to claim 5 wherein each byte contains a bit indicative of the detection of a light beam by an X detector and a bit indicative of the detection of a light beam by a serially sampled Y detector.

7. A device according to claim 1 wherein said optical emitters and optical detectors are infrared emitters and infrared detectors respectively.

8. A device according to claim 1 wherein the first driving means and the first decoder means comprise Darlington transistor arrays, the first driving means being interconnected with the emitter anodes, the first decoder means being interconnected with the emitter cathodes.

9. A device according to claim 1 wherein the first and second decoder means are BCD-to-decimal converters.

10. A device according to claim 1 wherein the microcomputer means comprises a microprocessor.

11. A touch interactive system responsive to the position of a passive stylus comprising:
    a host computer;
    a plurality of optical emitters, electrically interconnected in a first matrix, the optical emitters being linearly disposed, each optical emitter having emitter first and second terminals, each optical emitter being individually separately addressable in the matrix through the first and second terminals;
    a like plurality of optical detectors, electrically interconnected in a second matrix, the optical detectors also being linearly disposed, each optical detector having detector first and second terminals, each optical detector being individually separately addressable in the second matrix through the detector first and second terminals, corresponding emitters and detectors being oppositely disposed, each emitter emitting a light beam incident on a corresponding detector;
    a plurality of separate driver means, each driver means connected to emitter first terminals of a plurality of emitters, and first decoder means having a plurality of decoder lines, each first decoder line electrically interconnected to an emitter second terminal of a plurality of emitters, each emitter being electrically interconnected to a unique combination of driver means and first decoder lines to form the first matrix, the driver means and first decoder means comprising means for sequentially activating individual emitters within the first matrix;

second decoder means, each second decoder means having a plurality of lines, each second decoder line being connected to detector first terminals of the plurality of detectors, and a plurality of I/O signal lines, each I/O signal line being connected to detector second terminals of the plurality of detectors, each detector being connected to a unique combination of second decoder means and I/O signal lines to form the second matrix, the second decoder means and the I/O signal lines comprising means for sequentially activating the output of individual detectors within the second matrix; and microcomputer means between the opto-matrix frame and the host computer, the microcomputer means comprising means for activating the emitters and detectors, means for receiving the detector output and means for transmitting signals to the host computer, the microcomputer means further comprising means for processing signals received from the detectors to generate data indicative of the interference of a passive stylus with light beams between emitter-detector pairs before transmitting data to the host computer.

12. The touch interactive system of claim 11 wherein the microcomputer comprises means for transmitting signals to the host computer indicative of the interference of a passive stylus with consecutive emitter-detector pairs.

13. The touch interactive system of claim 12 wherein the host computer comprises means for counting the number of interrupted emitter-detector pairs.

14. The touch interactive system of claim 13 wherein the host computer comprises means for developing a signal indicative of the centerline of the passive stylus interfering with consecutive emitter-detector pairs.

15. The touch interactive system of claim 11 wherein the microcomputer means comprises a microprocessor.

* * * * *

UNITED STATES PATENT OFFICE
CERTIFICATE OF CORRECTION

Patent No. 4,761,637                    Dated August 2, 1988

Inventor(s) Paul B. Lucas and James E. Garrett

It is certified that error appears in the above-identified patent and that said Letters Patent are hereby corrected as shown below:

In Column 12, line 54, delete the word "separately" and replace with --independently--.

In Column 12, line 60, delete the word "separately" and replace with --independently--.

Signed and Sealed this

Twenty-ninth Day of November, 1988

Attest:

DONALD J. QUIGG

Attesting Officer            Commissioner of Patents and Trademarks